Oct. 31, 1961    A. W. JACOBS    3,006,558
LAWN SPRINKLER NOZZLE
Filed March 19, 1958

INVENTOR.
ARTHUR W. JACOBS
BY
Oberlin & Limbach
ATTORNEYS

United States Patent Office 3,006,558
Patented Oct. 31, 1961

3,006,558
LAWN SPRINKLER NOZZLE
Arthur W. Jacobs, 5994 Columbia Road,
North Olmsted, Ohio
Filed Mar. 19, 1958, Ser. No. 722,476
6 Claims. (Cl. 239—267)

The present invention relates generally as indicated to a lawn sprinkling system and nozzles therefor, and more particularly to a sprinkling system in which the nozzles thereof can be quickly and easily shut off simply by pushing down the baffles or spray heads thereof, thus making it possible to concentrate the sprinkling in given areas or to successively sprinkle different areas, as when the water pressure is low.

Hitherto, in known sprinkling systems it has been proposed to bury the piping systems under ground with the perforate sprinkling heads of the risers disposed at approximately ground level. In such systems it also has been proposed to provide risers that have sprinkling heads that are forced upwardly above the ground by water pressure, such heads dropping down to ground level by gravity when the water is shut off. A disadvantage of that type of sprinkling system is that when the available water pressure is low, there is only a small trickle of water coming out of each of the several sprinkling heads whereby proper wetting of the lawn cannot be accomplished. Similarly, if a certain area of the lawn needs extra watering, it is not possible with that system to concentrate the sprinkling at that area.

It also is known in the art to provide adjustable sprinkling nozzles that can be shut off as by providing for threaded engagement between the stem of the baffle or sprinkler head and the nozzle body, but that entails the use of a screwdriver or some other tool, and in addition, a lock nut or equivalent means must be employed to prevent unscrewing of the baffle from the body. Such nozzles obviously are rather expensive to produce.

With the foregoing in mind, it is one object of this invention to provide a simplified sprinkling system which can be readily installed simply by cutting into the turf a distance of about 2", for example, and folding back the turf to form narrow furrows into which plastic tubing and fittings are laid, followed by turning the turf back down and tamping the same. Such tamping is preferably done while the nozzles are closed and while the tubing is filled with water under pressure so as to prevent flattening of the plastic tubing.

It is another object of this invention to provide a sprinkling system in which the sprinkler nozzles are closed simply by pressing down the baffles thereof whereby selected nozzles may be left open for concentrating the sprinkling in desired areas or for achieving proper sprinkling even with low water pressure.

It is another object of this invention to provide a sprinkling nozzle in which the baffle is arranged to spin or whirl under the influence of the emerging water to produce a fine, uniform conical spray.

It is another object of this invention to provide a sprinkling nozzle which is secured on a fitting body by means of a standard fitting nut which ordinarily is used for connecting the end of a tube to the body.

It is yet another object of this invention to provide a sprinkling nozzle in which the fitting body is in the form of a T and is integrally formed with a prong or spike opposite the lateral outlet which is adapted to be inserted into the ground and which has at its respective ends or run outlets a female thread for engagement with the standard male thread fitting at the end of a length of garden hose and a male thread for engagement with a closure cap or with a standard swivel female thread fitting of a second length of garden hose may be secured for mounting of another sprinkling nozzle at the remote male thread fitting end of such second length of garden hose. The lateral outlet of the body is formed with a male thread for engagement with a nut which serves to clamp the sprinkler head assembly in place.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

Figure 1:
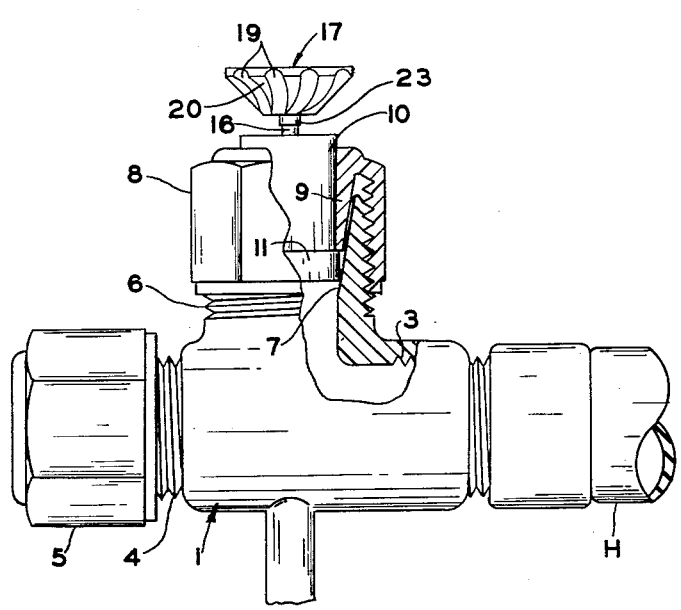
FIG. 1 is a side elevation view (partly in section) of one form of the present sprinkling nozzle having screwed into one end of the body thereof the male thread fitting at the end of a length of garden hose and having screwed onto the other end a closure cap.
Figure 2:
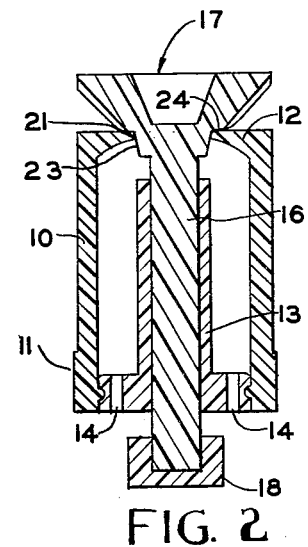
FIG. 2 is an enlarged cross-section view of the FIG. 1 sprinkler head assembly showing the same in closed position.

Referring now in detail to the drawings and first to FIGS. 1 and 2, the sprinkling nozzle shown therein comprises a molded nylon or like plastic fitting body 1 which is in the form of a T and which has a downwardly extending prong 2 adapted to be stuck into the ground. One run outlet 3 is internally threaded for threaded engagement with the male thread fitting of a length of garden hose H and the other run outlet 4 is externally threaded for threaded engagement with a closure cap 5. Should it be desired to provide a sprinkling system that includes a series of sprinkling nozzles, it is a simple matter to unscrew the closure caps 5 and to screw onto the run outlets 4 the female thread swivel fittings of successive lengths of garden hose.

The lateral outlet 6 of the fitting body 1 is externally threaded and is formed with a tapered bore 7. Screwed onto the lateral outlet 6 is a fitting nut 8 which has an integral tapered ferrule 9. When said nut 8 is used for gripping a tube T, as in FIG. 4, the ferrule 9 will be contracted by wedged engagement with the tapered bore 7 and thus will frictionally grip the tube T.

The sprinkler housing 10 is of generally tubular form formed with a collar or shoulder 11 adjacent its lower end with which the end of the ferrule 9 of the fitting nut 8 is engaged to wedge the lower end portion of the sprinkler housing 10 in the tapered bore 7 to form a sealed joint. The upper end of the sprinkler housing 10 is formed with an inturned flange 12 and press-fitted into said sprinkler housing 10 is a guide member 13 provided, adjacent its lower end, with four or more arcuate slots 14. The upper end of the guide member 13 terminates short of the flange 12 to provide a passage for flow of water.

Rotatable in the central vertical bore of the guide member 13 and axially slidable therein is the stem 16 of the conical baffle member 17, there being a washer 18 press-fitted onto the lower end of said stem to serve as a stop to limit the upward movement of the baffle member 17. The bottom frusto-conical surface of the head of the baffle member 17 is formed with a plurality of spiral grooves 19 which are of generally semi-circular cross-section and which merge together at the small end of the frusto-conical surface. Thus, the ribs or vanes 20 between successive grooves 19 start from feather edges and become progressively wider toward the large end of the frusto-conical surface. The annular stream of water flowing upwardly between the central opening 21 in the sprinkler housing 10 and the stem 16 of the baffle member 17 smoothly flows into the annular series of grooves 19 causing the baffle member 17 to whirl about the axis of the stem 16 to produce a uniform conical spray.

A distinctive feature of the present invention is that the nozzle assembly can be closed simply by pushing down the baffle member 17 until the tapered surface or wedge seat 23 thereof engages in the central opening 21 in the sprinkler housing 10. It has been found that when the tapered surface 23 has an included angle of less than about 10° (preferably 6°), the baffle member 17 may be easily pressed down but yet the wedging action and static friction is sufficient to hold it in closed position against the full water pressure.

Preferably, all of the parts of the sprinkler nozzle herein are molded of nylon or like plastic material which does not swell or corrode and which can be accurately made so that all assemblies are identical in performance. Moreover, a material such as nylon has a low dynamic coefficient of friction so that the baffle member 17 will freely spin at high speed. The higher static coefficient of friction of nylon is of great assistance in holding the nozzle assembly in closed position.

The baffle member 17 may be provided with a stop shoulder 24 so that even though the head of the baffle member 17 is stepped on the finger tips yet may be inserted under the head to lift the baffle member 17 to open position. The baffle member will, of course, rest by gravity in a position with the tapered surface 23 lightly engaging the opening 21 but, as soon as the water is turned on, the water pressure will lift the baffle member 17 and spin it as aforesaid.

Figure 3:
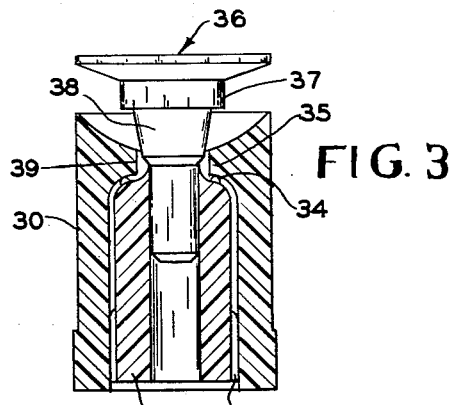
FIG. 3 is a cross-section view of another form of sprinkler head assembly which may be used with the sprinkling nozzle shown in FIG. 1; and, FIG. 4 is a side elevation view (partly in section) of one of the sprinkling nozzles of an underground sprinkling system, the sprinkler head assembly being either of the types shown in FIG. 2 or FIG. 3.

Referring now to FIG. 3, the sprinkler housing 30 may be similar to that shown in FIG. 1 embodiment. In this case, however, the guide member 31 is vertically slidable in housing 30 and has peripheral guide ribs 32 that are slidable in the bore of the sprinkler housing 30. Protuberances 34 at the upper end of said guide member serve to maintain the minimum space, of say .020", between the upper end of the guide member 31 and the bottom surface of the inturned flange 35 of the sprinkler housing 30. The baffle member 36 has a head or flange at the top thereof which diverts the water outwardly and upwardly in the form of a conical spray and, like the baffle member 17, it has a stop shoulder 37 and with a wedge seat 38. However, in this case, the reduced lower end of the stem of the baffle member 36 is a press-fit in the center bore of the guide member 31 so as to vertically reciprocate with the latter. When it is desired to shut off the FIG. 3 nozzle assembly, all that it is necessary to do is to push down on the flange of the baffle member 36 to effect wedging of the seat 38 in the center opening 39 of the sprinkler housing 30.

It has been found that in pushing down the baffle member 36 it is somewhat self-actuating after the wedge seat 38 is in close proximity with the wall of the opening 39. It is believed that such self-closing action is due to the transition of the water pressure from kinetic to static or is due to the shock or "water hammer" effect acting downwardly on the upper end of the guide member 31 tending to drive it and the baffle member 36 downwardly. In any event, whatever the scientific explanation may be, it has been observed that the baffle member 36 can be pressed down easily with light finger pressure, but yet when it is attempted to lift the same, a greater force is required.

Again, as in FIG. 1, all of the parts of the FIG. 3 nozzle assembly will preferably be made of a material such as nylon which has relatively great strength, hardness, resilience, toughness, and is inert in water and in the chemicals and fertilizers which come into contact therewith.

Figure 4:
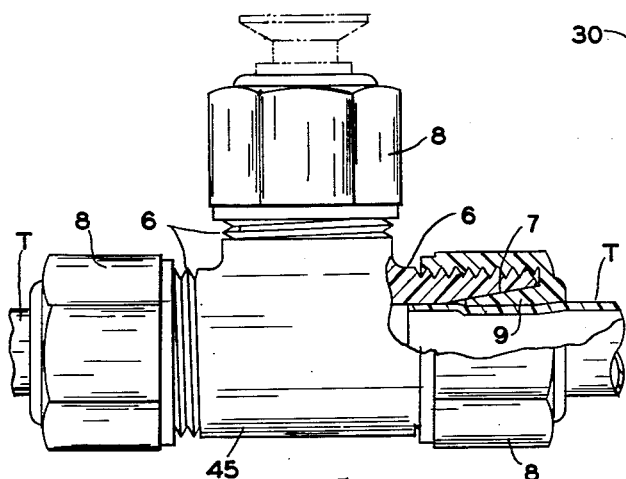

Referring now to FIG. 4, the fitting body 45 is a standard nylon T made, for instance, in accordance with my Patent No. 2,775,110, granted July 17, 1956, and having externally threaded run and lateral outlets 6 each of which is formed with a tapered bore 7. When polyethylene or like tubing T is inserted into the run outlets, the tightening of the fitting nuts 8 causes the ferrule portions 9 to be radially contracted by the tapered bores 7 into firm gripping engagement with the inserted tubes T. In fact, the end of the nylon ferrule 9 will bite into such polyethylene tubing and will plow up a slight ridge or shoulder thereon whereby the tubing will be effectively held against withdrawal from the fitting body 45.

Insofar as the lateral outlet is concerned, instead of inserting a tube therein, the end of the ferrule 9 of the fitting nut 8 is operative to engage the collar or shoulder of the sprinkler housing 10 or 30 to thus clamp the housing in fluid-tight relation against the tapered bore 7.

The sprinkling system made up of lengths of plastic tubing T, fitting bodies 45, nuts 8, and sprinkler nozzle assemblies of the FIG. 2 or FIG. 3 type may be easily installed simply by cutting obliquely into the turf as with a flat end spade to a depth of about 2" and turning over the turf about its uncut side. By doing that there are provided a network of generally V-shaped furrows into which may be laid and assembled the lengths of polyethylene tubing T secured together by the fitting bodies 45 and nuts 8 on the run outlets 6. The nuts 8 are then screwed onto the lateral outlets, clamping the sprinkling nozzle assemblies in place in wedged engagement with the tapered bores 7. The first length of plastic tubing is then secured to the water supply valve or sill cock whereupon the water may be turned while the nozzles are open, thereby bleeding out the air from the system. Thereafter, the water may be shut off and all of the baffle members pressed down to closed position. Then the water is turned on and the turf may be turned back in the furrows and tamped down, the water pressure in the plastic tubing T being effective to prevent the tubing from being flattened during the tamping operation.

Other modes of applying the principle of the invention may be employed, change being made as regards the details described, provided the features stated in any of the following claims, or the equivalent of such, be employed.

I therefore particularly point out and distinctly claim as my invention:

1. In a lawn sprinkling system, the combination of a series of fitting bodies interconnected by conduits with a source of water pressure and each provided with an upwardly extending lateral outlet; and nozzle assemblies secured in the respective lateral outlets of said bodies; each nozzle assembly comprising a housing having a bore through the top thereof for flow of water, and a baffle member having a spray head upon which the water issuing from such bore impinges, said baffle member being slidably supported by said housing and being formed with a seat engageable with such bore to stop the flow of water through such bore when said baffle member is pressed down; said seat and bore being interfitted for self-locking wedged engagement to retain said nozzle assembly in closed position until said baffle member is forcefully lifted with respect to said housing.

2. The system of claim 1 wherein said housing has a guide member therein, and wherein said baffle member has a stem portion that is rotatable and slidable in said guide member.

3. The system of claim 1 wherein said baffle member is provided with a stop shoulder that engages the top of said housing to limit the extent of downward pressing of said baffle member.

4. A sprinkling nozzle comprising a T-fitting body having a run outlet adapted for connection with a water supply conduit and a lateral outlet; and a nozzle assembly secured to said lateral outlet; said nozzle assembly comprising a housing having a bore therethrough for flow of water, and a baffle member having a spray head upon which the water issuing from such bore impinges, said baffle member being slidably supported by said housing and being formed with a seat; said seat and bore being interfitted for self-locking wedged engagement to stop the flow of water through such bore when said baffle member is pressed down.

5. A sprinkling nozzle comprising a T-fitting body having externally threaded run and lateral outlets each formed with a tapered bore; nuts threaded onto said outlets and having integral tapered ferrules which cooperate with such tapered bores to grip the ends of tubes inserted into such run outlets; and a sprinkler nozzle assembly inserted into such lateral outlet to engage the tapered bore therein and having a clamping shoulder engaged by the end of the ferrule of the nut that is screwed onto such lateral outlet whereby, when said last-mentioned nut is tightened, said nozzle assembly is wedged against the tapered bore of the lateral outlet.

6. A spray nozzle assembly comprising a tubular housing adapted to be secured to a fitting body and with a passageway therethrough terminating in a bore; a baffle member axially slidably supported by said housing and having a head upon which fluid issuing from such bore impinges, a seat on said baffle member; said seat and bore being interfitted for self-locking wedged engagement to lock said seat within such bore to stop the flow of fluid from such bore when said baffle member is pressed axially inwardly.

References Cited in the file of this patent

UNITED STATES PATENTS

| | | |
|---|---|---|
| 1,286,333 | Johnson | Dec. 3, 1918 |
| 1,496,645 | Kaufman | June 3, 1924 |
| 1,764,570 | Lohman | June 17, 1930 |
| 1,767,028 | Williams | June 24, 1930 |
| 1,779,691 | Bennett | Oct. 28, 1930 |
| 2,078,903 | Domack | Apr. 27, 1937 |
| 2,360,203 | Cox | Oct. 10, 1944 |
| 2,478,976 | Modlin | Aug. 16, 1949 |
| 2,564,465 | Clark | Aug. 14, 1951 |
| 2,706,134 | Wilson et al. | Apr. 12, 1955 |
| 2,796,293 | Becker | June 18, 1957 |
| 2,859,932 | Mackal | Nov. 11, 1958 |

FOREIGN PATENTS

| | | |
|---|---|---|
| 132,641 | Australia | June 2, 1949 |